April 4, 1967 J. CADIOU 3,312,249
AERODYNAMIC VALVE FOR HIGH-FREQUENCY OPERATION
Filed March 31, 1964
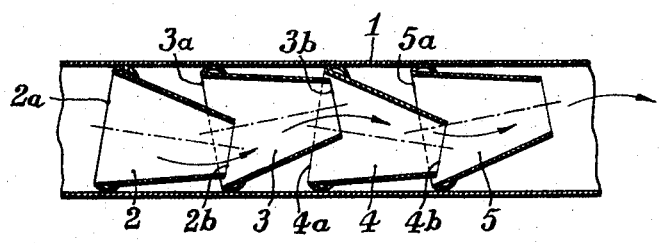

United States Patent Office 3,312,249
Patented Apr. 4, 1967

3,312,249
AERODYNAMIC VALVE FOR HIGH-
FREQUENCY OPERATION
Jean Cadiou, Paris, France, assignor to Societe Anonyme
Andre Citroen, Paris, France
Filed Mar. 31, 1964, Ser. No. 356,311
Claims priority, application France Apr. 2, 1963,
930,098, Patent 1,362,526
3 Claims. (Cl. 138—42)

Under certain high-frequency conditions conventional-type valves display a certain inertia impairing the quality of their operation; moreover, they are attended by a relatively high loss of pressure.

It is the essential object of this invention to provide an "aerodynamic" valve free of any moving mechanical part and causing in the direction of flow of the fluid directed therethrough only a very moderate loss of pressure, this valve, although it does not prevent completely the fluid flow in the reverse direction, interferes considerably with this reverse fluid flow and creates very high pressure losses.

To this end, the aerodynamic valve according to this invention is characterized in that it consists of a tubular body having mounted therein in series a plurality of frustoconical elements having their large base inscribed in the bore of said tube and their small bases directed towards the large base of the next frustoconical element, all the frustoconical elements of the device being inclined in alternately opposite directions; in a specific form of embodiment or arrangement of this invention one side of each of said frustoconical elements may be parallel to the tube axis.

The single figure of the attached drawing illustrates diagrammatically by way of example a typical form of embodiment of the invention.

Disposed inside the tubular body 1 are a plurality of frustoconical elements 2, 3, 4 and 5 having their large bases 2a, 3a, 4a and 5a inscribed in said tube and their small bases 2b, 3b, 4b projecting slightly into the large base of the next frustoconical element 3, 4 and 5, as shown.

It is obvious that, by properly calculating or selecting the inner diameter of tube 1, this valve cannot interfere with the fluid flow in the direction of the arrows; on the other hand, the return of the fluid flow in the reverse direction is effectively restrained; moreover, this valve, free of any moving mechanical part, operates almost instantaneously and may therefore be used at a relatively high frequency of reversal of the direction of flow.

Of course, the present invention should not be construed as being limited by the specific form of embodiment shown and described herein by way of example, since many modifications may be brought thereto without departing from the spirit and scope of the invention as set forth in the appended claims.

What I claim is:
1. An aerodynamic valve consisting of a tube permitting the free flow of an escaping fluid and hindering the fluid counter-current, and of a plurality of successive frustoconical elements having their large bases inscribed in said tube and their small bases directed towards the large base of the next element, the axes of said elements being alternately inclined in opposite directions.
2. A valve as set forth in claim 1, wherein the small base of each frustoconical element projects slightly into the large base of the preceding frustoconical element.
3. A valve as set forth in claim 1, wherein one side of each frustoconical element is parallel to the tube axis.

References Cited by the Examiner

UNITED STATES PATENTS

| 1,101,561 | 6/1914 | McPhayden | 138—137 |
| 2,670,011 | 2/1954 | Bertin et al. | 138—44 |
| 2,856,962 | 10/1958 | Christoph | 138—42 |

FOREIGN PATENTS 1,114,937   4/1956   France.

LAVERNE D. GEIGER, *Primary Examiner.*

T. MOORHEAD, *Assistant Examiner.*